(12) United States Patent
Shimanuki et al.

(10) Patent No.: US 6,596,429 B2
(45) Date of Patent: Jul. 22, 2003

(54) FUEL CELL SYSTEM

(75) Inventors: Hiroshi Shimanuki, Wako (JP); Yoshio Kusano, Wako (JP); Toshikatsu Katagiri, Wako (JP); Motohiro Suzuki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 96 days.

(21) Appl. No.: 09/972,453

(22) Filed: Oct. 4, 2001

(65) Prior Publication Data

US 2002/0041985 A1 Apr. 11, 2002

(30) Foreign Application Priority Data

Oct. 5, 2000 (JP) ........................ P2000-306743
Jun. 18, 2001 (JP) ........................ P2001-183355

(51) Int. Cl.[7] .............................................. H01M 8/04
(52) U.S. Cl. .......................................... 429/34; 429/17
(58) Field of Search .............................. 429/34, 17, 19

(56) References Cited

U.S. PATENT DOCUMENTS 5,441,821 A   8/1995   Merritt et al. ................. 429/17
5,543,238 A   8/1996   Strasser ....................... 429/17

FOREIGN PATENT DOCUMENTS

JP   2001-266922   *   9/2001

* cited by examiner

Primary Examiner—John S. Maples
(74) Attorney, Agent, or Firm—Lahive & Cockfield, LLP

(57) ABSTRACT

A fuel cell system 10 of the present invention comprises a fuel cell 11, an ejector 15 which mixes an exhaust gas exhausted from the fuel cell 11 with a fuel gas, and circulating this mixed gas to the fuel cell 11, and a fuel humidifying section 16 for bringing the exhaust gas exhausted from the fuel cell 11 into contact with the fuel gas which is made to flow out from the ejector 15, via a water permeable membrane, to thereby humidify the fuel gas by the water content contained in the exhaust gas. The fuel humidifying section 16 is arranged between the fuel cell 11 and the ejector 15.

6 Claims, 5 Drawing Sheets

FUEL CELL SYSTEM

BACKGROUND OF THE INVENTION

1. Field of the Invention

The present invention relates to a fuel cell system using, for example, a solid polymer membrane for an electrolyte membrane, and more specifically relates to a technique which humidifies the solid polymer membrane.

2. Description of Related Art

A solid polymer type fuel cell comprises a stack (hereinafter referred to as a "fuel cell stack" or a "fuel cell") constituted by laminating a plurality of cells formed by placing a solid polymer electrolyte membrane between an anode and a cathode. Such a solid polymer type fuel cell generates by supplying hydrogen to the anode as a fuel, and air to the cathode as an oxidant so that hydrogen ions generated in a catalytic reaction at the anode passage through the solid polymer electrolyte membrane and move to the cathode, to thereby cause an electrochemical reaction at the cathode.

In order to maintain high generating efficiency, it is necessary to maintain the solid polymer electrolyte membrane in a saturated water content condition to thereby ensure a function as an ion conductive electrolyte membrane.

Therefore, a fuel cell system proposed for example in U.S. Pat. No. 5,543,238, comprises; an ejector which mixes fuel side exhaust gas exhausted from a fuel cell with fresh fuel gas newly supplied to the fuel cell and circulating the mixed gas to the fuel cell, and a humidifying apparatus arranged between this ejector and a fuel gas supply apparatus which humidifies the fresh fuel gas supplied to the ejector.

With this fuel cell, the vapor concentration (vapor partial pressure) of the fresh fuel gas supplied to the ejector is increased by the humidifying apparatus, the fresh fuel gas and the fuel side exhaust gas are mixed in the ejector, and the humidified mixed fuel gas is supplied to the fuel cell.

As in the above described related art, in the case where the fuel side exhaust gas exhausted from the fuel cell is utilized for circulation, a predetermined upper limit is set for the specific consumption of the fuel gas in the fuel cell, depending on the structure for flowing fuel gas to the inside of the fuel cell, the flow rate of the exhaust gas necessary for exhausting water generated inside of the fuel cell, and the properties of a catalyst constituting the fuel cell and the solid polymer electrolyte membrane. The specific consumption of the fuel is equal to a reciprocal of the stoichiometry (circulated amount of the fuel gas).

If the specific consumption of the fuel gas supplied to the fuel cell is made higher than the upper limit, a pressure difference of the fuel gas between cells in the vicinity of the supply port of the fuel gas and cells in the vicinity of the exhaust port increases within the fuel cell, and hence the output power from each cell constituting the fuel cell becomes nonuniform. Moreover, since generation of heat occurs at the time when the hydrogen ion generated from the fuel gas goes through the solid polymer electrolyte membrane, if the pressure difference of the fuel gas increases, the distributed heat source also becomes nonuniform in each cell, and for example, it becomes difficult to predict the life of the fuel cell. Hence, there is a possibility that it is difficult to maintain the performance of the fuel cell constant.

Accordingly, in the ejector, it is necessary to ensure a predetermined stoichiometry for the fuel gas. This stoichiometry is defined as a ratio of a flow rate Q1 of the fresh fuel gas introduced to the ejector to a flow rate Qa (=flow rate Q1 of the introduced fresh fuel gas+flow rate Q2 of the fuel side exhaust gas) of the mixed fuel gas exhausted from the ejector (Qa/Q1). As the water content contained in the fuel side exhaust gas increases, the partial pressure of the fuel gas contained in the fuel side exhaust gas decreases by the partial pressure of water, and hence the stoichiometry of the fuel gas itself cannot be sufficiently ensured.

Moreover, in the case where a predetermined stoichiometry is ensured in the ejector, the capacity for circulating the fuel side exhaust gas can be increased by, for example, setting a small nozzle diameter for of the ejector ejecting the fresh fuel gas, to thereby reduce the flow rate Q1 of the fresh fuel gas. In this case, however, a pressure loss for before and after the ejector increases.

Since the water vapor content which can be contained in the fuel gas increases, with a decrease of pressure of the fuel gas, for example, even if the fuel gas is in a high pressure condition with the relative humidity being 100%, after the fuel gas passes through the ejector and becomes in a low pressure condition, for example, the relative humidity decreases to 80%.

That is to say, if a humidifying apparatus is provided on the upstream side of the ejector, even if the relative humidity of the fuel gas is 100% before being introduced to the ejector, after the fuel gas passes through the ejector and becomes a low pressure condition, the relative humidity decreases, and there is a case where the humidified amount required for the fuel cell stack may not be satisfied.

As the pressure of the fresh fuel gas before being introduced to the ejector is set high, taking into consideration a pressure loss in the ejector for ensuring a predetermined anode-cathode pressure difference required between the anode and the cathode of the fuel cell, the water vapor content which can be contained in the fresh fuel gas decreases, thereby making it difficult to ensure the humidified amount required for the fuel cell stack.

In view of the above situation, it is an object of the present invention to provide a fuel cell system which can ensure a predetermined stoichiometry and a predetermined humidified amount required for the fuel cell, at the time of circulating and using the exhaust gas exhausted from the fuel cell.

SUMMARY OF THE INVENTION

In order to achieve the above object, the fuel cell system according to the present invention comprises: a fuel cell which generates power by an electrochemical reaction with a fuel gas supplied thereto; an ejector which mixes fuel side exhaust gas exhausted from said fuel cell with a fresh fuel gas, to generate mixed fuel gas, and circulating this mixed fuel gas to said fuel cell; and a humidifying device which humidifies said mixed fuel gas with water content contained in said exhaust gas, by bringing exhaust gas exhausted from said fuel cell into contact with said mixed fuel gas via a water permeable membrane.

According to the above described fuel cell system, the exhaust gas exhausted from the fuel cell (for example, the fuel side exhaust gas or the oxidant side exhaust gas) is used as the humidifying gas which humidifies the mixed fuel gas after having passed the ejector. The water content contained in the exhaust gas passes through membrane holes in, for example, a hollow fiber membrane and is diffused as water vapor in the mixed fuel gas.

As described above, since water content is added to the mixed fuel gas having a relatively low pressure and humidified on the downstream side of the ejector, much more water content can be added, compared to the case where water content is added to the fresh fuel gas having a relatively high pressure on the upstream side of the ejector. As a result, a decrease in the relative humidity attributable to a pressure loss of the fuel gas before and after passing through the ejector can be prevented, and the humidified amount required for the fuel cell can be reliably ensured.

In the case where the fuel side exhaust gas is used as the exhaust gas, the fuel side exhaust gas whose water content is reduced after passing through the humidifying device is added to the fresh fuel gas in the ejector. As a result, the concentration of the fuel gas contained in the fuel side exhaust gas increases, thereby enabling improvement in the stoichiometry of the fuel gas.

DETAILED DESCRIPTION OF THE INVENTION

Figure 1:
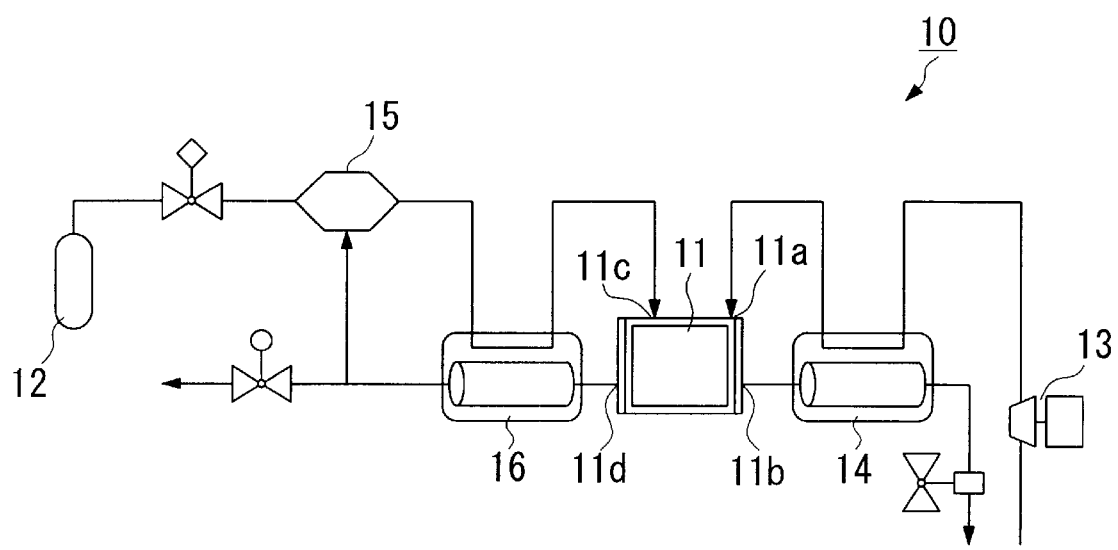
FIG. 1 is a block diagram of a fuel cell system according to one embodiment of the present invention.
Figure 2A:
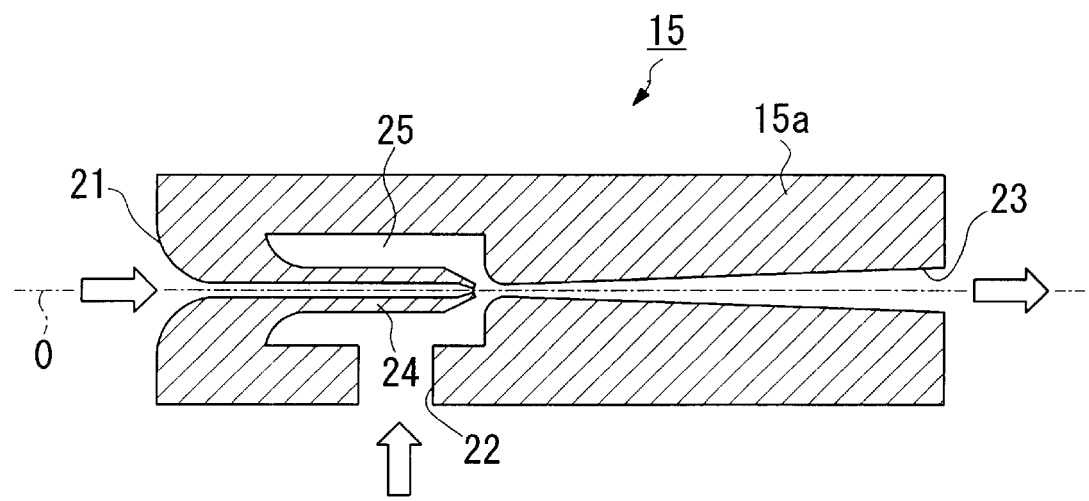
FIG. 2A is a sectional side elevation showing one example of an ejector.
Figure 2B:
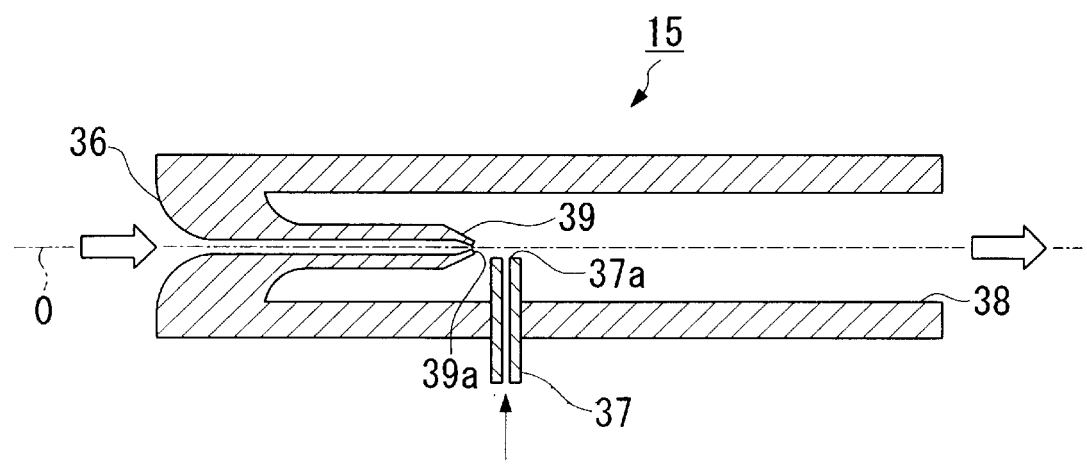
FIG. 2B is a sectional side elevation showing another example of the ejector.

An embodiment of a fuel cell system according to the present invention will now be described with reference to the drawings. FIG. 1 is a block diagram of a fuel cell system according to one embodiment of the present invention. FIG. 2A is a sectional side elevation showing one example of an ejector 15, and FIG. 2B is a sectional side elevation showing another example of the ejector 15.

The fuel cell system 10 in this example is mounted on a vehicle, for example, an electric car, and comprises a fuel cell 11, a fuel supply section 12, an oxidant supply section 13, an oxidant humidifying section 14, the ejector 15 and a fuel humidifying section 16.

The fuel cell 11 is constituted by laminating a plurality of cells formed by clamping a solid polymer electrolyte membrane consisting of, for example, a solid polymer ion-exchange membrane, between an anode and a cathode, and comprises a fuel electrode to which for example hydrogen is supplied as the fuel gas, and an air electrode to which air containing for example oxygen is supplied as an oxidant gas.

The air electrode is provided with an air supply port $11a$ for supplying air from the oxidant supply section 13, and an air exhaust port $11b$ for exhausting air in the air electrode to the outside. On the other hand, the fuel electrode is provided with a fuel supply port $11c$ for supplying hydrogen from the fuel supply section 12 and a fuel exhaust port $11d$ for exhausting hydrogen in the fuel electrode to the outside.

The oxidant supply section 13 comprises for example, an air compressor, and is controlled in accordance to the load of the fuel cell 11 and input signals from an accelerator pedal (not shown), to supply air to the air electrode of the fuel cell 11, via the oxidant humidifying section 14.

The oxidant humidifying section 14 comprises a water permeable membrane constituting for example, a hollow fiber membrane, and uses the oxidant side exhaust gas exhausted from the air exhaust port $11b$ of the fuel cell 11 as the humidifying gas for the oxidant gas supplied from the oxidant supply section 13. That is to say, when the oxidant gas is brought into contact with the oxidant side exhaust gas via the water permeable membrane constituting for example, a hollow fiber membrane, the water content (especially, water vapor) contained in the oxidant side exhaust gas passes through the membrane holes in the hollow fiber membrane and is supplied to the oxidant gas as water vapor.

The fuel gas supplied from the fuel supply section 12 is circulated in the ejector 15 and the fuel humidifying section 16, and then supplied to the fuel cell 11.

As shown in FIG. 2A, the ejector comprises, for example, a fluid supply port 21, a return flow introduction tube 22, a fluid exhaust tube 23, a nozzle 24 and a return flow chamber 25.

The return flow chamber 25 consisting for example of a substantially columnar space coaxial with an axis O, is formed inside of the ejector body $15a$, and a return flow introduction tube 22 extending in a direction orthogonal to the axis O is connected thereto, with one end of the return flow introduction tube 22 being opened on the inner peripheral surface of the return flow chamber 25, and the other end thereof being opened on the outside of the ejector body $15a$.

In the direction along the axis O of the ejector 15, a substantially cylindrical nozzle 24 protrudes coaxially with the axis O from the inner wall surface at one end of the return flow chamber 25, and the tip of this nozzle 24 is arranged so as to come close to the inner wall surface at the other end of the return flow chamber 25.

A fluid supply port 21 opened on the outside of the ejector body $15a$ is provided at a base end of the nozzle 24, and the nozzle 24 has a tapered inner periphery, with the diameter gradually decreasing from the base end towards the tip.

On the other inner wall surface of the return flow chamber 25, one end of the fluid exhaust tube 23 penetrating the ejector body $15a$ along the direction of the axis O is opened, while the other end of the fluid exhaust tube is being opened to the outside of the ejector body $15a$.

As shown in FIG. 1 and FIG. 2A, to the fluid supply port 21 of the ejector 15, fresh fuel gas is supplied from the fuel supply section 12, and to the return flow introduction tube 22, is introduced fuel side exhaust gas exhausted from the fuel exhaust port $11d$ of the fuel cell 11 and passed through the fuel humidifying section 16.

The fresh fuel gas supplied from the fluid supply port 21 is accelerated during passing through the nozzle 24, and ejected into the return flow chamber 25 from the tip of the nozzle towards the fluid exhaust tube 23. In the vicinity of this high-speed fuel flow, the fuel side exhaust gas introduced from the return flow introduction tube 22 into the return flow chamber 25 is drawn into the high-speed fuel flow and brought into the fluid exhaust tube 23. Accompanying this, a negative pressure occurs in the return flow chamber 25, and the fuel side exhaust is drawn from the return flow introduction tube 22.

The ejector 15 is not limited to one having the structure shown in FIG. 2A, and may be one having the structure shown in FIG. 2B. This other example of the ejector 15 will be described with reference to FIG. 2B.

This ejector 15 comprises, for example, a fuel flow supply port 36, an introduction tube 37, a fuel flow exhaust tube 38, and a nozzle 39.

The nozzle 39 connected to the fuel flow supply port 36 along the axis O has a tapered inner peripheral face with the diameter thereof decreasing gradually from the base end towards the tip. The base end of the nozzle 39 is connected to the base end of the fuel flow exhaust tube 38 having a substantially cylindrical shape, and the tip of the nozzle 39 protrudes towards the inside of the fuel flow exhaust tube 38 coaxially with the axis O.

To the fuel flow exhaust tube 38 is connected the introduction tube 37 extending in a direction orthogonal to the axis O, penetrating the tube wall, with one end 37a of the introduction tube 37 opening into the fuel flow exhaust tube 38 and arranged in the vicinity of the opening end at the tip 39a of the nozzle 39, and the other end thereof protruding outside of the fuel flow exhaust tube 38. The fuel side exhaust gas is introduced into the introduction tube 37 of the ejector 15.

When fresh fuel gas is supplied from the fuel flow supply port 36 of the ejector 15, the fresh fuel gas is accelerated during passing through the nozzle 39. In the vicinity of the high-speed fuel flow discharged from the tip of the nozzle 39 into the fuel flow exhaust tube 38, the fuel side exhaust gas discharged from the introduction tube 37 is drawn into the high-speed fuel flow and brought towards the tip of the fuel flow exhaust tube 38. Accompanying this, a negative pressure is generated in the fuel flow exhaust tube 38, and the fuel side exhaust gas is drawn from the introduction tube 37 so as to make up for this negative pressure.

The fresh fuel gas and the fuel side exhaust gas mixed in the ejector 15 is exhausted from the fluid exhaust tube 23 or the fuel flow exhaust tube 38 as the mixed fuel gas, and supplied to the fuel humidifying section 16. That is to say, the fuel side exhaust gas exhausted from the fuel cell 11 is circulated via the ejector 15.

The fuel humidifying section 16 comprises a water permeable membrane constituting, for example, a hollow fiber membrane, and utilizes the fuel side exhaust gas exhausted from the fuel cell 11 as the humidifying gas for the mixed fuel gas which is made to flow from the ejector 15. For example, when the fresh fuel gas is brought into contact with the fuel side exhaust gas via the water permeable membrane such as a hollow fiber membrane, the water content (particularly, water vapor) contained in the fuel side exhaust gas is supplied to the mixed fuel gas as water vapor, after having passed through membrane holes in the hollow fiber membrane.

The mixed fuel gas humidified in the fuel humidifying section 16 is supplied to the fuel cell 11, to thereby ensure the ion conductivity of the solid polymer electrolyte membrane.

The operation of this fuel cell system 10 will now be described.

Figure 3:
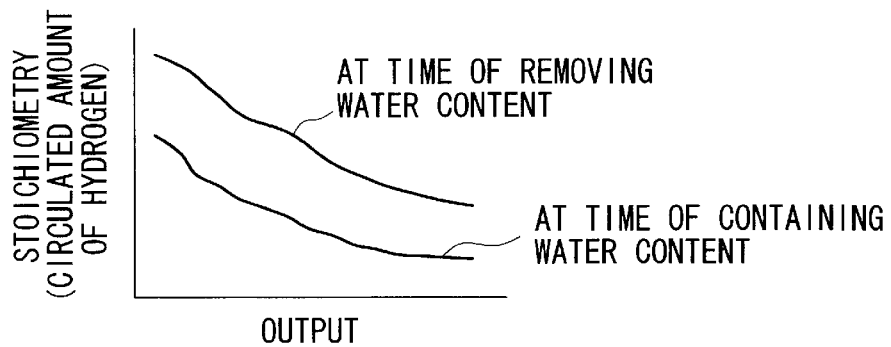
FIG. 3 is a graph showing changes in the water content contained in the exhaust gas introduced into a return flow introduction tube of the ejector, and in the stoichiometry of the fuel.
Figure 4:
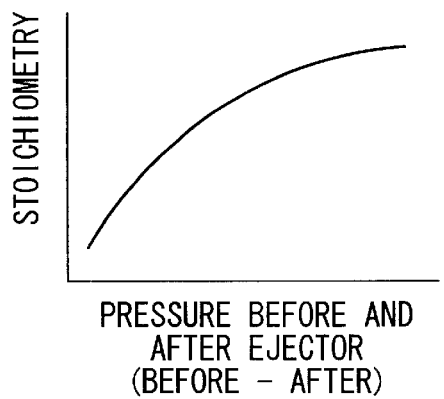
FIG. 4 is a graph showing changes in a pressure difference of the fuel gas before and after the ejector and the stoichiometry of the fuel.
Figure 5:
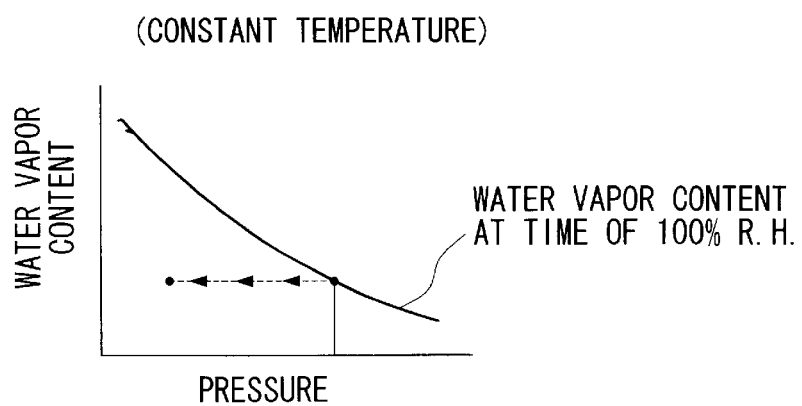
FIG. 5 is a graph showing a relation between the water vapor content contained in the fuel gas having a constant temperature and a relative humidity of 100%, and the pressure.
Figure 6:
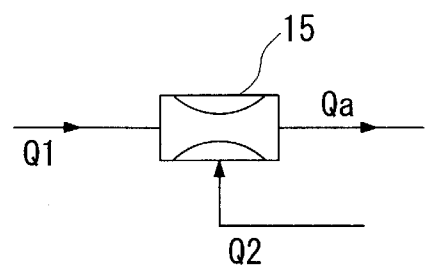
FIG. 6 is a conception diagram showing the relation between a flow rate Q1 of the fuel gas supplied to the ejector, a flow rate Q2 of the exhaust gas introduced from a return flow introduction tube, and a flow rate Qa of the fuel gas exhausted from the ejector.

FIG. 3 is a graph showing changes in the water content contained in the fuel side exhaust gas introduced into the return flow introduction tube 22 of the ejector 15, and in the stoichiometry of the fuel, against the output of the fuel cell. FIG. 4 is a graph showing changes in pressure difference of the fuel gas for before and after the ejector 15 and the stoichiometry of the fuel. FIG. 5 is a graph showing the relation between the pressure and the water vapor content contained in the fuel gas at a constant temperature and a relative humidity of 100%. FIG. 6 is a conception diagram showing the relation between a flow rate Q1 of the fuel gas supplied to the ejector 15, a flow rate Q2 of the exhaust gas introduced from the return flow introduction tube 22, and a flow rate Qa of the fuel gas exhausted from the ejector 15.

In the case where the fuel side exhaust gas exhausted from the fuel cell 11 by the ejector 15 is circulated and used, a predetermined threshold is set for the specific consumption of the supplied fuel gas, depending on, for example, the structure for circulating the fuel gas inside of the apparatus, the flow rate of the exhaust gas required for exhausting water generated inside to the outside, and the properties of the catalyst and the solid polymer electrolyte membrane constituting the fuel cell 11. The specific consumption of the fuel is made equal to a reciprocal of the stoichiometry (that is, the circulated amount of the fuel gas).

That is to say, as shown in FIG. 6, the circulated amount of the fuel gas (stoichiometry S) is defined as:

$$S=Qa/Q1=(Q1+Q2)/Q1,$$

where Q1 is the flow rate of the fuel gas supplied to the ejector 15, Q2 is the flow rate of the exhaust gas introduced from the return flow introduction tube 22, and Qa is the flow rate of the fuel gas exhausted from the ejector 15.

If water is contained in the exhaust gas, the flow rate Q2 of the exhaust gas is defined as a sum of the flow rate Qf of only the fuel and the flow rate Qw of water (Q2=Qf+Qw). Therefore, in the case where the stoichiometry S of the fuel gas is controlled to a predetermined value, as the water amount contained in the exhaust gas increases, the stoichiometry of the fuel itself decreases.

As shown in FIG. 3, the stoichiometry of the fuel for the same output can be increased in the case where water is removed from the exhaust gas introduced to the return flow introduction tube 22 of the ejector 15, compared to the case where water is contained therein.

In the fuel cell system 10 according to this embodiment, the fuel side exhaust gas discharged from the fuel cell 11 is first supplied to the fuel humidifying section 16 and used as the humidifying gas for the fuel gas, and is then introduced to the return flow introduction tube 22 of the ejector 15. That is to say, the water content contained in the fuel side exhaust gas is consumed in the fuel humidifying section 16, and the fuel side exhaust gas in which the water content contained therein is reduced is circulated to the fuel cell 11 via the ejector 15. Hence the stoichiometry of the fuel itself, that is, hydrogen can be improved.

In order to increase the stoichiometry in the ejector 15, the nozzle diameter of the ejector 15, into which the fresh fuel gas is introduced, is set to be small, to reduce the flow rate Q1 of the fresh fuel gas, thereby enabling the stoichiometry of the fuel side exhaust gas to be increased. In this case, however, as shown in FIG. 4, the pressure loss for before and after the ejector (that is, between the upstream side and the downstream side thereof) increases.

As shown in FIG. 5, as the pressure of the fuel gas decreases, the water vapor content containable in the fuel gas increases. Therefore, for example, even in the case of a fuel gas in a high-pressure state having a relative humidity of 100%, if the gas passes through the ejector 15 and becomes a low-pressure state, the relative humidity decreases to, for example, 80%.

Therefore, even if an appropriate humidifying apparatus is provided on the upstream side of the ejector 15 and the relative humidity of the fuel gas before being introduced to the ejector 15 is set to 100%, which is the upper limit, there may be a case where the humidified amount of the fuel gas does not satisfy the humidified amount required for the fuel cell 11.

In the fuel cell system 10 according to this embodiment, the mixed fuel gas obtained by mixing the fuel side exhaust gas with the fresh fuel gas in the ejector 15 is supplied to the fuel humidifying section 16 and humidified therein, and then supplied to the fuel cell 11. That is to say, humidification is performed for the fuel gas on the downstream side of the ejector 15, where the pressure is relatively low compared to the upstream side of the ejector 15. Therefore, for example, in the case where the pressure of the fresh fuel gas before being introduced into the ejector 15 is set relatively high, taking into consideration the pressure loss in the ejector 15, in order to ensure a predetermined anode-cathode pressure required between the anode and the cathode of the fuel cell 11, the relative humidity in the fuel gas does not decrease. As a result, a predetermined humidified amount required for the fuel cell 11 can be ensured.

As described above, according to the fuel cell system 10 in this embodiment, the fuel humidifying section 16 is arranged between the ejector 15 and the fuel cell 11, and the fuel side exhaust gas is utilized as the humidifying gas for the mixed fuel gas. Hence the stoichiometry of the fuel itself, that is, hydrogen can be improved.

Furthermore, since the mixed fuel gas is humidified on the downstream side of the ejector 15 where the gas pressure is relatively low compared to the upstream side thereof, much more water content can be added. As a result, a decrease in the relative humidity due to the pressure loss of the fuel gas passing through the ejector 15 can be prevented, and a predetermined humidified amount required for the fuel cell 11 can be reliably ensured.

In the above embodiment, the fuel humidifying section 16 utilizes the fuel side exhaust gas exhausted from the fuel exhaust port 11*d* of the fuel cell 11 as the humidifying gas for the mixed fuel gas made to flow out from the ejector 15. However the present invention is not limited thereto.

Figure 7:
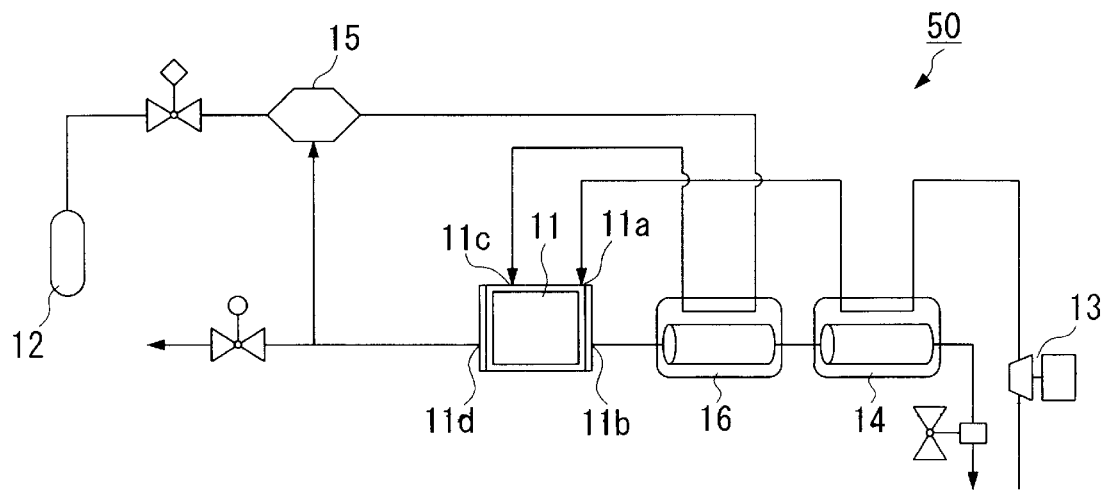
FIG. 7 is a block diagram of a fuel cell system according to a first modified example in this embodiment.

For example, FIG. 7 shows a fuel cell system 50 according to a first modified example of this embodiment. In this example, the oxidant side exhaust gas exhausted from an air exhaust port 11*b* of a fuel cell 11 may be utilized as the humidifying gas for the mixed fuel gas made to flow out from an ejector 15.

In the fuel cell system 50 according to this first modified example, a fuel humidifying section 16 is arranged on the upstream side of an oxidant humidifying section 14, in the circulation direction of the exhaust air exhausted from the fuel cell 11. That is to say, exhaust air exhausted from the air exhaust port 11*b* of the fuel cell 11 is first brought into contact with the mixed fuel gas via a water permeable membrane constituting for example, a hollow fiber membrane, in the fuel humidifying section 16, and after having passed through membrane holes in the hollow fiber membrane, the water content (particularly, water vapor) contained in the oxidant side exhaust gas is supplied to the mixed fuel gas as water vapor.

Then, the oxidant side exhaust gas having passed through the fuel humidifying section 16 is brought into contact with the oxidant gas via the water permeable membrane in the oxidant humidifying section 14, and the water content (particularly, water vapor) contained in the oxidant side exhaust gas is supplied to the oxidant gas as water vapor, after having passed through membrane holes in the hollow fiber membrane.

In this case, the mixed fuel gas is humidified by the oxidant side exhaust gas on the downstream side of the ejector 15, where the pressure is relatively low compared to the upstream side thereof, and humidification is performed by utilizing the oxidant side exhaust gas which has a relatively high water content contained therein, compared to the fuel side exhaust gas. Hence the mixed fuel gas can be effectively humidified.

Moreover, since the mixed fuel gas having a low pressure is humidified, then compared to a case where the fresh fuel gas having a relatively high pressure is humidified by the oxidant side exhaust gas, as for example on the upstream side of the ejector 15, it is possible to suppress the passing of the fuel gas through the hollow fiber membrane and the mixing with the oxidant side exhaust gas. Therefore, even in a case where the oxidant humidifying section 14 provided on the downstream of the fuel humidifying section 16 has hydrogen permeability, or where an ejector for circulating the oxidant side exhaust gas is provided on the air electrode side of the fuel cell 11, the fuel gas can be prevented from being mixed in a large amount into the air electrode side of the fuel cell 11.

Figure 8:
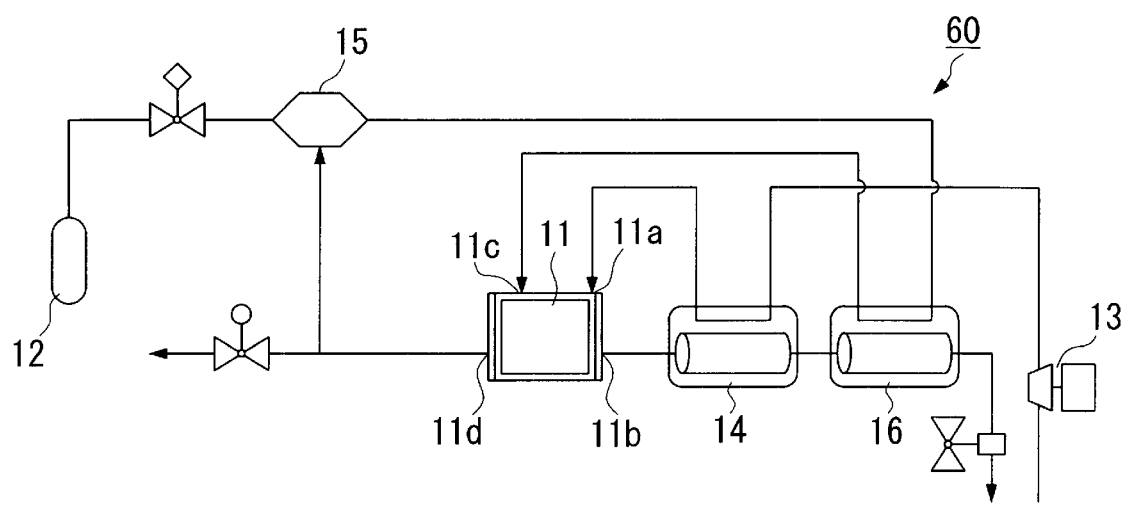
FIG. 8 is a block diagram of a fuel cell system according to a second modified example in this embodiment.

In the above described first modified example, the fuel humidifying section 16 is arranged on the upstream side of the oxidant humidifying section 14, in the circulation direction of the exhaust air exhausted from the fuel cell 11. However the present invention is not limited thereto. For example, as in a fuel cell system 60 according to a second modified example shown in FIG. 8, the fuel humidifying section 16 may be arranged on the downstream side of the oxidant humidifying section 14, in the circulation direction of the exhaust air exhausted from the fuel cell 11.

In this case, the oxidant side exhaust gas exhausted from the air exhaust port 11*b* of the fuel cell 11 is first brought into contact with the fresh oxidant gas via a water permeable membrane in the oxidant humidifying section 14, and the water content (particularly, water vapor) contained in the oxidant side exhaust gas is supplied to the oxidant gas as water vapor, after having passed through membrane holes in the hollow fiber membrane.

The oxidant side exhaust gas having passed through the oxidant humidifying section 14 is further brought into contact with the mixed fuel gas via a water permeable membrane, constituting for example a hollow fiber membrane, in the fuel humidifying section 16, and the water content (particularly, water vapor) contained in the oxidant side exhaust gas is supplied to the mixed fuel gas as water vapor, after having passed through the membrane holes in the hollow fiber membrane.

In this case, since the oxidant side exhaust gas having passed through the oxidant humidifying section 14 is brought into contact with the mixed fuel gas via the water permeable membrane in the fuel humidifying section 16, even in a case where the fuel gas has permeated into the oxidant side exhaust gas in the fuel humidifying section 16, the exhaust air in which this fuel gas is mixed therein is not used as the humidifying gas, but is exhausted outside. Hence, mixing of the fuel gas into the air electrode side of the fuel cell 11 can be prevented.

What is claimed is:

1. A fuel cell system comprising:
    a fuel cell which generates power by an electrochemical reaction with a fuel gas supplied thereto;

an ejector which mixes fuel side exhaust gas exhausted from said fuel cell with a fresh fuel gas, to generate mixed fuel gas, and circulating this mixed fuel gas to said fuel cell; and a humidifying device which humidifies said mixed fuel gas with water content contained in said exhaust gas, by bringing exhaust gas exhausted from said fuel cell into contact with said mixed fuel gas via a water permeable membrane.

2. A fuel cell system according to claim 1, wherein said humidifying device brings said fuel side exhaust gas as said exhaust gas into contact with said mixed fuel gas, via said water permeable membrane.

3. A fuel cell system according to claim 1, wherein said fuel cell is supplied with an oxidant gas as well as said fuel gas, and said fuel side exhaust gas and said oxidant side exhaust gas are exhausted therefrom; and said humidifying device brings said oxidant side exhaust gas as said exhaust gas into contact with said mixed fuel gas, via said water permeable membrane.

4. A fuel cell system comprising:

a fuel cell which is supplied with a fuel gas and an oxidant gas, generates power by an electrochemical reaction, and exhausts fuel side exhaust gas and oxidant side exhaust gas;

an ejector which mixes said fuel side exhaust gas with fresh fuel gas to thereby generate mixed fuel gas, and circulating said mixed fuel gas to said fuel cell;

a first humidifying device which humidifies said mixed fuel gas, by bringing said oxidant side exhaust gas into contact with said mixed fuel gas via a water permeable membrane; and a second humidifying device which humidifies said oxidant gas, by bringing said oxidant side exhaust gas into contact with said oxidant gas via a water permeable membrane.

5. A fuel cell system according to claim 4, wherein said oxidant side exhaust gas exhausted from said fuel cell flows through said first humidifying device and then flows through said second humidifying device.

6. A fuel cell system according to claim 4, wherein said oxidant side exhaust gas exhausted from said fuel cell flows through said second humidifying device and then flows through said first humidifying device.

* * * * *